US009232497B2

(12) United States Patent
Park et al.

(10) Patent No.: US 9,232,497 B2
(45) Date of Patent: Jan. 5, 2016

(54) MOBILE COMMUNICATION SYSTEM AND PAGING MESSAGE PROCESSING METHOD THEREOF

(71) Applicant: Samsung Electronics Co., Ltd, Gyeonggi-do (KR)

(72) Inventors: Kyungwon Park, Gyeonggi-do (KR); Sungwoon Kang, Gyeonggi-do (KR); Hangsuk Huh, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

(21) Appl. No.: 13/769,119

(22) Filed: Feb. 15, 2013

(65) Prior Publication Data
US 2013/0210430 A1    Aug. 15, 2013

(30) Foreign Application Priority Data

Feb. 15, 2012  (KR) .................. 10-2012-0015302

(51) Int. Cl.
H04W 68/02    (2009.01)
(52) U.S. Cl.
CPC .................................... H04W 68/02 (2013.01)
(58) Field of Classification Search
CPC ..... H04W 68/02; H04W 60/00; H04W 60/04; H04W 8/26; H04W 12/06; H04W 8/04
USPC .................... 455/435.1, 458, 552.1
See application file for complete search history.

(56) References Cited

U.S. PATENT DOCUMENTS

| | | | |
|---|---|---|---|
| 2008/0102831 A1* | 5/2008 | Ore ............................ | 455/435.1 |
| 2008/0214190 A1* | 9/2008 | Aalto ......................... | 455/435.1 |
| 2010/0167756 A1* | 7/2010 | Park et al. .................. | 455/456.1 |
| 2010/0220680 A1* | 9/2010 | Ramankutty et al. ......... | 370/329 |
| 2011/0105117 A1* | 5/2011 | Chin et al. .................. | 455/435.1 |
| 2011/0117931 A1* | 5/2011 | Hu et al. .................... | 455/456.1 |
| 2012/0157132 A1* | 6/2012 | Olsson et al. ................ | 455/458 |
| 2012/0184275 A1* | 7/2012 | Okabe et al. ................ | 455/435.1 |
| 2012/0190374 A1* | 7/2012 | Jo et al. ....................... | 455/450 |
| 2012/0202488 A1* | 8/2012 | Yang et al. .................... | 455/433 |

* cited by examiner

Primary Examiner — Kashif Siddiqui
Assistant Examiner — Minjung Kim

(57) ABSTRACT

A paging message processing method is capable of handling paging message processing delay in handover from a Wideband Code Division Multiple Access (WCDMA) network to a Long Term Evolution (LTE) network. A Mobile Switching Center (MSC) includes determines, when an inbound call occurs, whether a Mobility Management Entity (MME) system exists; transmits, when no MME exists, a paging message over an IU interface; determines, when no response message is received, whether a location registration request is received form the MME; transmits, when the location registration request is received, a location registration response to the MME system to deliver the paging message via the MME system; and processes, when a paging response is received, the inbound call. In a heterogeneous network handover from a WCDMA network to an LTE network, the MSC hands over the paging procedure control to the MME immediately so as to facilitate processing the inbound call.

10 Claims, 4 Drawing Sheets

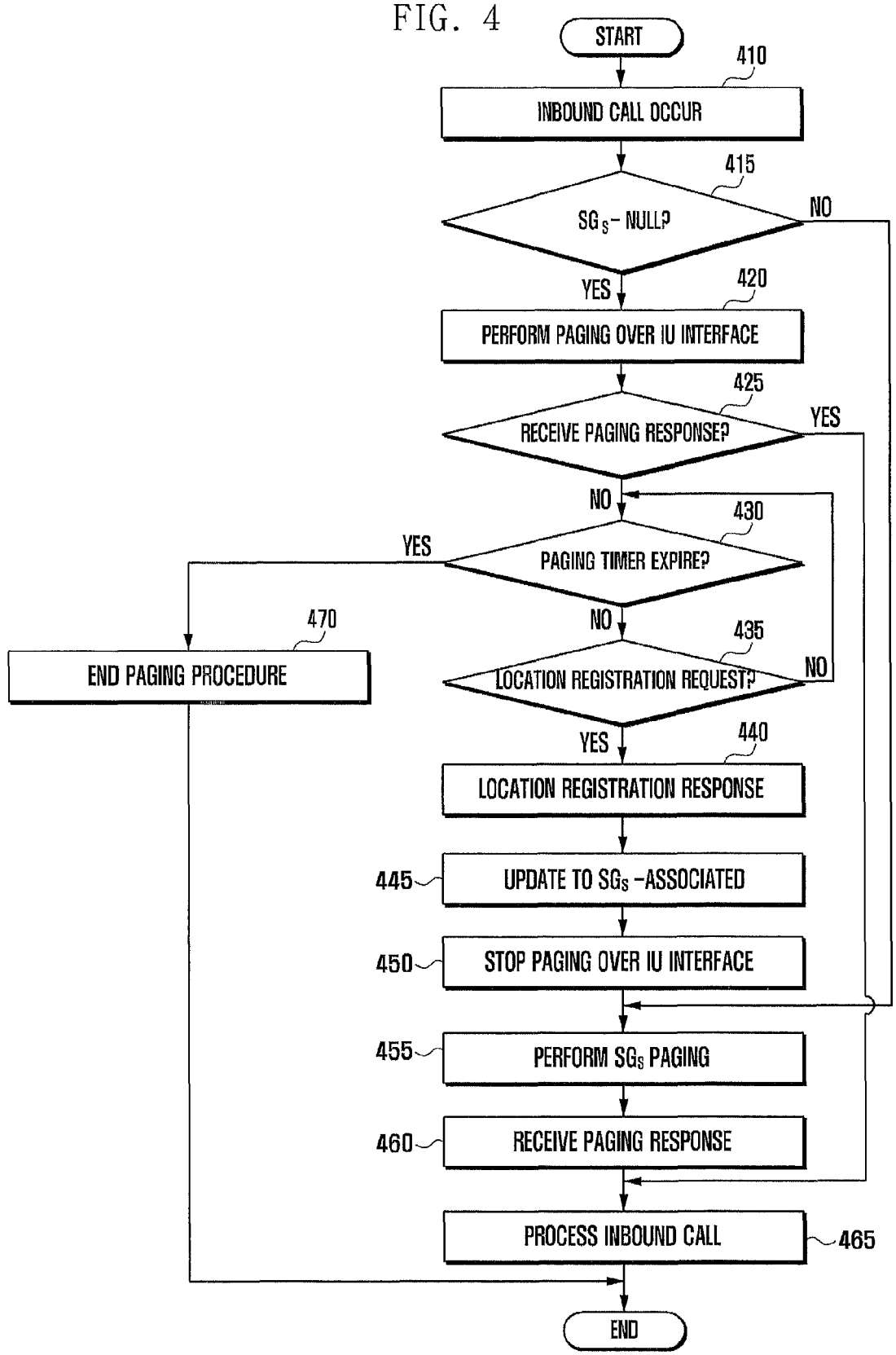

MOBILE COMMUNICATION SYSTEM AND PAGING MESSAGE PROCESSING METHOD THEREOF

CROSS-REFERENCE TO RELATED APPLICATION(S) AND CLAIM OF PRIORITY

The present application is related to and claims the benefit under 35 U.S.C. §119(a) of a Korean patent application filed on Feb. 15, 2012 in the Korean Intellectual Property Office and assigned Serial No. 10-2012-0015302, the entire disclosure of which is hereby incorporated by reference.

TECHNICAL FIELD

The present application relates to mobile communications and, in particular, to a mobile communication system and paging message processing method thereof for handling paging message processing delay in handover from a Wideband Code Division Multiple Access (WCDMA) network to a Long Term Evolution (LTE) network.

BACKGROUND

FIG. 1 illustrates an architecture of a mobile communication system.

Referring to FIG. 1, an LTE User Equipment (UE) 105 is located in an area where the Mobility Management Entity (MME) 110 area including an MME 115 and an Evolved Universal Mobile Telecommunication System Terrestrial Radio Access Network (E-UTRAN) 120 and an Wideband Code Division Multiple Access (WCDMA) area 125 including a UTRAN 130 and a Mobile Switching Center (MSC) 135 are overlapped. The UE 105 is capable of communicating with the E-UTRAN 120 and UTRAN 130.

In order for the LTE UE 105 located in the LTE network to handle a Circuit-Switched (CS) call process, it is required to operate with CS Fall Back (CSFB) function. That is, once the network switching from the LTE network to the WCDMA network 125 has completed using the CSFB function, the UE 105 can place an outbound CS call or receive an inbound CS call. Once the CS call has been processed completed, the LTE UE 105 is capable of returns to the LTE mode according to a switching policy.

In order to achieve this, the LTE UE 105 has to follow the handling rules between E-UTRAN 120 and UTRAN 130 and between MME 115 and MSC 135.

SUMMARY OF THE INVENTION

Typically, the network switching from the WCDMA network from the LTE network takes a few seconds. Accordingly, if an inbound call occurs in the middle of the network switching procedure, the LTE UE has to delay paging response transmission or can fail receiving the paging message.

It is an object of the present disclosure to provide a mobile communication system and a paging message processing method thereof that is capable of efficiently handling the paging message.

In accordance with an aspect of the present disclosure, a paging message processing method of a Mobile Switching Center (MSC) system includes determining, when an inbound call occurs, whether a Mobility Management Entity (MME) system exists; transmitting, when no MME exists, a paging message over an IU interface; determining, when no response message is received, whether a location registration request is received from the MME; transmitting, when the location registration request is received, a location registration response to the MME system to deliver the paging message via the MME system; and processing, when a paging response is received, the inbound call.

In accordance with another aspect of the present disclosure, a paging message processing system includes a communication unit that transmits a paging message and receives a response message in response to the paging message; and a control unit that determines, when an inbound call occurs, whether a Mobility Management Entity (MME) system exists, transmits, when no MME exists, a paging message over an IU interface, determines, when no response message is received, whether a location registration request is received from the MME, transmits, when the location registration request is received, a location registration response to the MME system to deliver the paging message via the MME system, and processes, when a paging response is received, the inbound call.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 illustrates the paging message processing method in the MSC system according to an embodiment of the present disclosure.

DETAILED DESCRIPTION OF THE INVENTION

Figure 1:
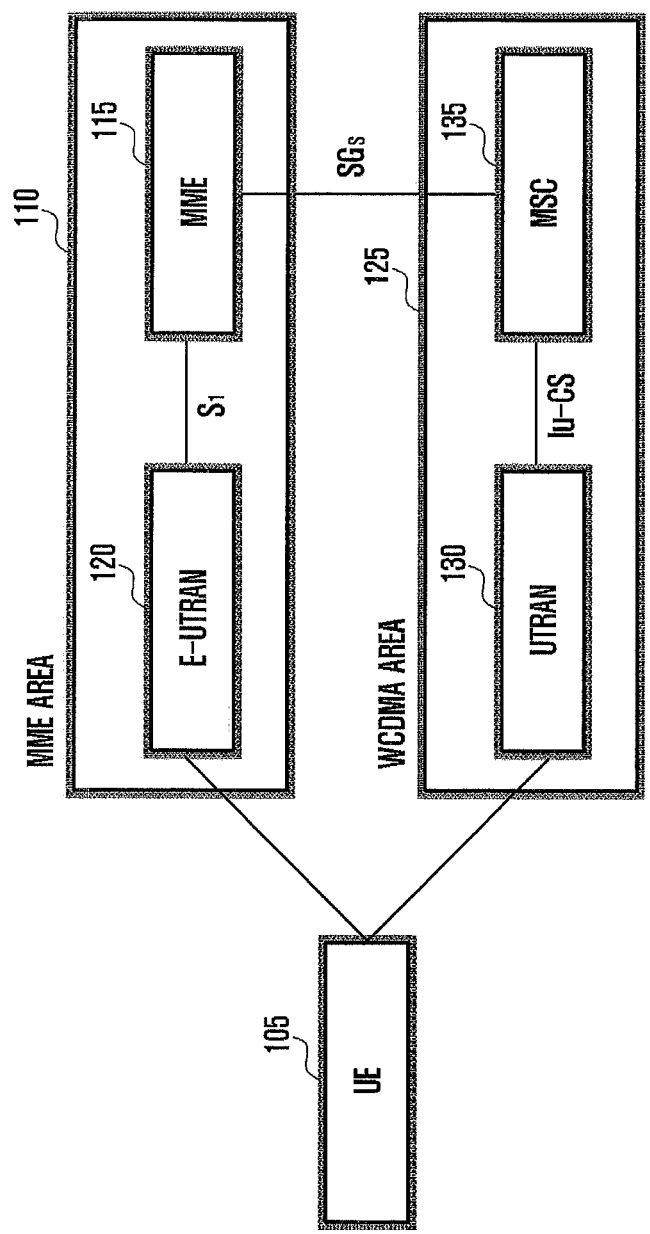
FIG. 1 illustrates an architecture of a mobile communication system.
Figure 2:
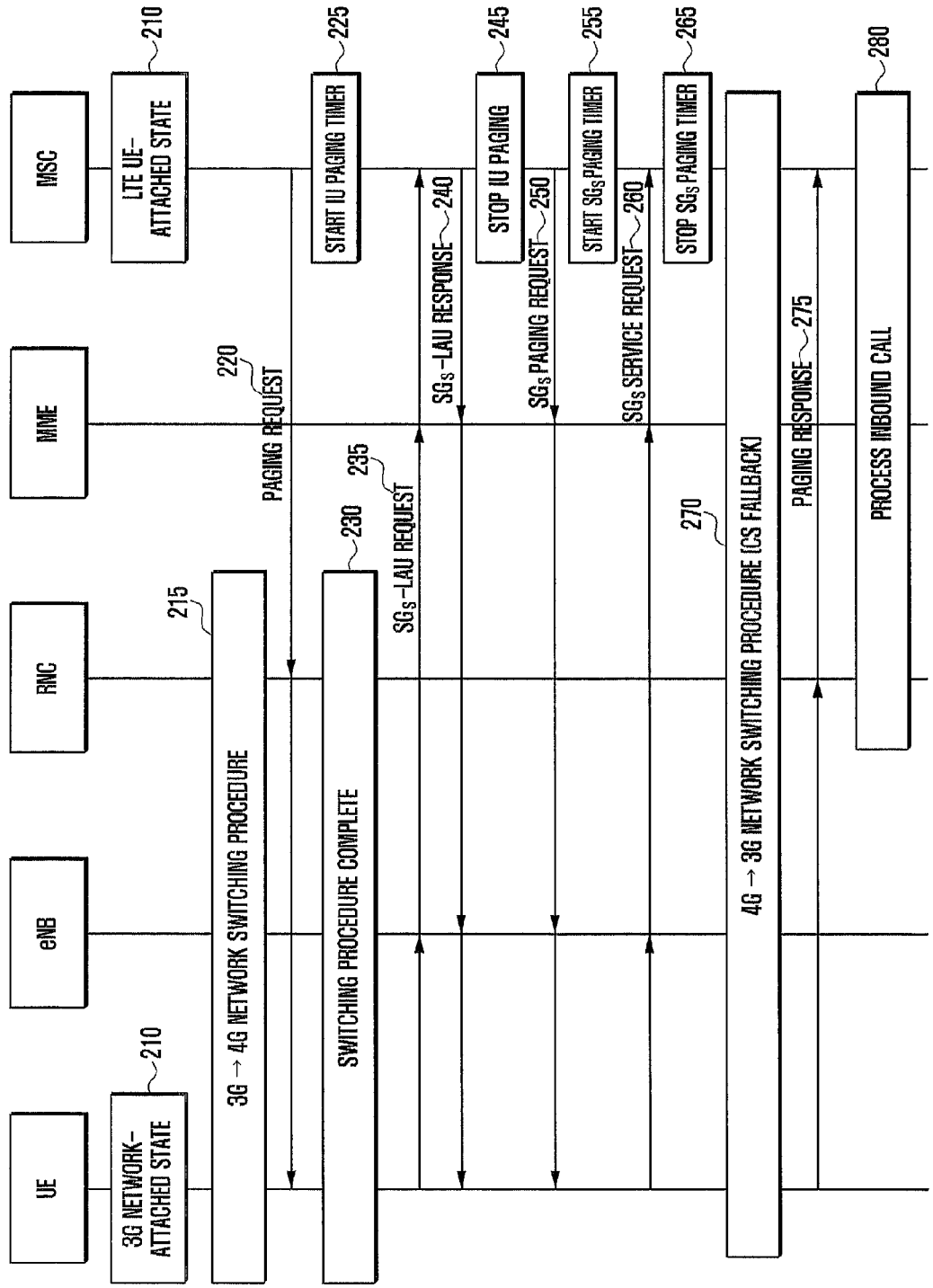
FIG. 2 illustrates signal flows for paging message handling between the mobile communication systems according to an embodiment of the present disclosure.
Figure 3:
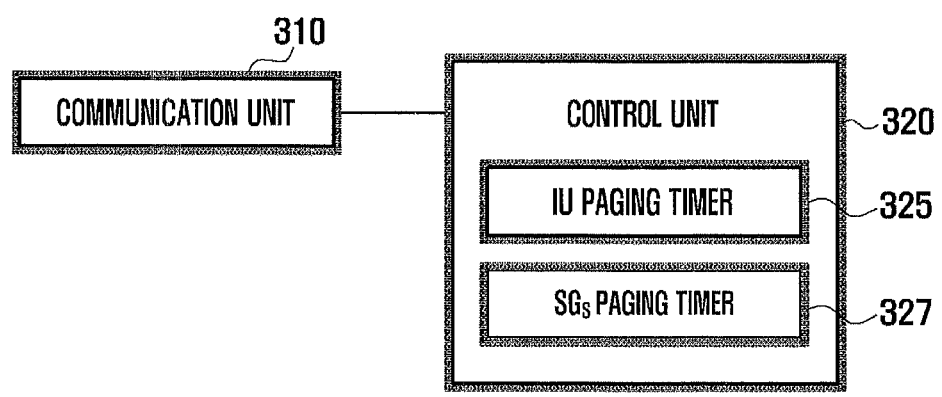
FIG. 3 illustrates the configuration of the MSC system according to an embodiment of the present disclosure.

FIGS. 2 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications device. Exemplary embodiments of the present disclosure are described with reference to the accompanying drawings in detail. Detailed description of well-known functions and structures incorporated herein may be omitted to avoid obscuring the subject matter of the present disclosure. Furthermore, terms used herein are defined by taking functions of the present disclosure into account and can be changed according to the practice or intention of users or operators. Therefore, definition of the terms should be made according to overall disclosures set forth herein.

The present disclosure proposes a paging switch function operating in such a way that when a Circuit-Switched (CS) inbound call occurs to the LTE UE in the middle of switching from the WCDMA network to the LTE network the MSC system switches back to the most recently attached network to avoid paging message processing delay or paging message reception failure.

More particularly, if an inbound call occurs during the UEs' network switching from the WCDMA network to the LTE network, the UE may not receive the paging message transmitted by the MSC. In embodiments of the present disclosure, if the MME area where the UE is located is registered before expiration of an IU paging timer set for determining whether the receipt of the paging message is acknowledged, the MSC system is capable of transmitting the paging message to the UE through the corresponding MME system.

If it is requested to perform a call processing to a certain LTE UE, the MSC system checks Service Gateways (SGs) Association state between the MSC and MME. If it is not connected to the MME system, i.e., if the SGs Association state is SGs-NULL state, the MSC system sends the LTE UE a Paging Request message through the IU interface and waits for a Paging response.

If it is in the middle of switching from the WCDMA network to the LTE network, the LTE UE does not receive the paging request message transmitted by the MSC system through the IU interface. At this time, the MCS system determines whether a paging response message is received before the expiration of the IU paging timer.

If the network switch from the WCDMA network to the LTE network has completed, the LTE UE performs location registration procedure with the LTE network. The MME system sends an SGs Location Area Update Request message to the MSC system to request for location registration. If the SG location registration has completed, the MSC system sets the SGs Association state to SGs-Associated.

If the SGs location registration procedure has completed, the MSC system stops the ongoing paging procedure over the IU interface immediately. Next, the MSC system hands over the paging procedure control to the MME system. Next, the MSC system sends the UE a SGs Paging Request message through the MME system. If a Paging response message is received from the UE, the MSC system processes the inbound call. At this time, the UE moved to the LTE network receives the paging request message through the MME system and afterward processes the inbound call through the normal CSFB procedure.

It takes a few seconds (about 2~3 seconds) for the UE to switch from the WCDMA network to the LTE network. Accordingly, if an inbound call process occurs to the LTE network, which is performing network switch between heterogeneous networks, it is difficult to perform the paging process normally. As a consequence, the inbound call is likely to be fail due to the reason of No Paging Response. In the paging control handover function according to embodiments of the present disclosure, the MSC system is capable of detecting the network switch at the time of completion of the SGs location registration procedure of the UE. The MSC system hands over the paging procedure control to the MME immediately to handle the inbound call.

FIG. 2 illustrates signal flows for paging message handling between the mobile communication systems according to an embodiment of the present disclosure.

Referring to FIG. 2, the LTE UE (hereinafter, referred to as UE) supporting communication over LTE network is attached to a 3G network, i.e. WCDMA network, and the MSC system is in an attach state with the LTE UE at step 210. That is, the UE is being served by the WCDMA network as a 3G network for data communication.

The UE performs network switching procedure from the 3G WCDMA network to the 4 LTE network at step 215. That is, the UE performs heterogeneous network handover procedure. If an inbound call occurs in the middle of performing the handover from the WCDMA network to the LTE network, the MSC system detects the call. In this case, the MSC system sends the UE a paging request message triggered by the inbound call through the Radio Network Controller (RNC) system at step 220. At this time, the MSC system is connected to the RNC system through the IU interface. The MSC system starts an IU paging timer for determining receipt of a paging response in response to the paging message at step 225.

If the handover from the WCDMA network to the LTE network has completed at step 230, the UE sends the MSC system a Service Gateways-Location Area Update (SGs-LAU) request message including UE information through the eNB and the MME at step 235. The MSC system sends the UE an SGs-LAU response message through the MME and the eNB at step 240. At this time, the MSC system is connected with the MME system through the SGs interface.

The MSC system stops the IU paging procedure at step 245. Next, the MSC system sends the UE an SGs paging request message through the MME system and the eNB at step 250. The MSC system starts the SGs paging timer at step 255. The UE sends the MSC system a SGs service request message through the eNB and the MME system at step 260. That is, the UE sends the MSC system a response through the eNB and the MME system in response to the SGs paging request message.

If the SGs service request message is received from the UE, the MSC stops the SGs paging timer at step 265. The UE and the MSC system performs the network switching from the 4G network to the 3G network at step 270. That is, the UE and the MSC system perform the CS fallback procedure. Next, the UE sends a paging response message to the MSC system through the RNC at step 275. Finally, the RNC and MSC system process incoming call service.

FIG. 3 illustrates a configuration of the MSC system according to an embodiment of the present disclosure.

Referring to FIG. 3, the MSC system includes a communication unit 310 and a control unit 320. The communication unit 310 communicates signals with the UE through the RNC system and the MME system under the control of the control unit 320. Here, the communication unit 310 is capable of transmitting a paging message to the RNC system connected through the IU interface under the control of the control unit 320. The communication 310 is also capable of delivering the location registration request message received from the MME to the control unit 320. The communication unit 310 is capable of transmitting the paging message to the MME connected through the SGs interface under the control of the control unit 320.

The control unit 320 controls states and operations of the components of the MSC system. If an inbound call occurs, the control unit 320 is capable of checking the UE location and transmitting a paging message. More particularly, if an inbound call is detected, the control unit 320 determines whether there is MME system location information of the UE. That is, the control unit 320 determines whether the SGs is null. If the SGs is null, the control unit 320 controls the communication unit 310 to transmit the paging message to the UE through the RNC system connected through the IU interface. At this time, the control unit 320 starts the IU paging timer 325 set for determining a receipt of the response message in response to the paging message. Next, the control unit 320 determines whether the paging response is received through the communication unit 310 in response to the paging message transmitted to the UE.

If no paging response is received, the control unit 320 determines whether the IU paging timer 325 has expired. If the IU paging timer has not expired, the control unit 320 determines whether a location registration request is received by the communication unit 310 from the MME system.

If a location registration is requested from the MME system, the control unit 320 registers the location of the MME system and transmits a location registration response message. At this time, the control unit 320 changes the SGs-Null state for SGs-Associated state to indicate the state connected to the MME system. Next, the control unit 320 connects to the MME system through the SGs interface. The control unit 320 stops the paging procedure on the IU interface.

The control unit 320 sends the MME system a paging message for inbound call processing. The control unit 320 also starts the SGs paging timer 327. Through this, the control unit 320 is capable of determining whether the paging response message is received before the expiry of the SGs paging timer 327.

If a paging response message is received from the MME through the communication unit 310 in response to the paging message, the control unit 320 establishes a channel for delivering the inbound call to the corresponding UE. However, the IU paging timer 325 expires without receiving the paging response message and the location registration request message, the control unit 320 ends the paging procedure.

FIG. 4 illustrates the paging message processing method in the MSC system according to an embodiment of the present disclosure.

Referring to FIG. 4, if an inbound call occurs at step 410, the MSC system 410 determines whether the SGs is null at step 415. That is, the MSC system determines where there is an MME system connected. At this time, the MME system is the system managing the UE to which the inbound call is addressed, and the MSC system is capable of checking the UE attached to the LTE network other than WCDMA based on whether the SGs is null.

If the SGs is null, the MSC system performs the paging procedure through IU interface at step 420. That is, the MSC system transmits a paging message to the UE through the RNC system connected to the MSC system. Here, the MSC system starts the IU paging timer to determine whether the paging response is received in a predetermined time. Next, the MSC system determines whether a paging response is received from the UE in response to the paging message at step 425.

If no paging response is received, the MSC system determines whether the IU paging timer has expired at step 430. If the paging time has not expired, the MSC system determines whether a location registration request is received from the MME at step 435. That is, the UE is registered with the MME system after the handover from the WCDMA network to the LTE network. The MME system notifies the MSC system of the MME location to indicate that the UE control is handed over to the MME. In order to accomplish this, the MME system sends the MSC system a location registration request message.

If the location registration request message is received from the MME system, the MSC system registers the MME system location and sends a location registration response message to the MME system at step 440. Next, the MSC system updates the SGs state to SGs-Associated state to notify of the connection with the MME system at step 445. At this time, the MSC system is connected to the MME system through the SGs interface. The MSC system stops the paging procedure through the IU interface at step 450.

The MSC system performs a paging procedure through the SGs interface at step 455. That is, the MSC system transmits a paging message for handling inbound call to the MME system. Although not shown in the drawing, the MSC system starts an SGs paging timer. Through this, the MSC system determines whether a paging response message is received before the expiry of the SGs paging timer. If no paging response message is received before the expiry of the SGs paging timer, the MSC system ends the paging procedure.

The MSC system receives a paging response message from the MME system in response to the paging message at step 460. Next, the MSC system processes the inbound call at step 465. That is, the MSC system establishes a channel for the inbound call to the UE.

Returning to FIG. 430, if the paging timer has completed, the MSC system ends the paging procedure at step 470. Since this procedure is identical with the conventional paging message processing procedure, detailed description thereon is omitted herein. Briefly, if no paging response message is received before the expiry of the timer, the MSC system ends the paging procedure. After a predetermined period elapses, the MSC system transmits the paging message the UE again.

As described above, the paging message processing method of the present disclosure is implemented in such a way that the MSC system is capable of detecting the SGs location registration procedure complete timing of the LTE UE moved from a WCDMA network to an LTE network. The MSC system hands over the paging procedure control to the MME system immediately to facilitate processing the inbound call.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A paging message processing method of a mobile switching center (MSC) system, the method comprising:
   determining, if an inbound call occurs, whether a mobility management entity (MME) system exists;
   transmitting, if no MME system exists, a paging message over an IU interface;
   determining whether an IU paging timer has expired, wherein the IU paging timer is used to determine whether a response to the paging message has been received;
   determining, if no response message is received, whether a location registration request is received from the MME system;
   transmitting, if the location registration request is received, a location registration response to the MME system to deliver the paging message via the MME system;

stopping the paging procedure over the IU interface;
transmitting the paging message via the MME system connected through service gateways (SGs); and
processing, if a paging response is received, the inbound call.

2. The method of claim 1, wherein determining whether the location registration request is received comprises determining whether the location registration has been requested before the IU paging timer expires.

3. The method of claim 2, further comprising ending, if the IU paging timer has expired, the paging procedure.

4. The method of claim 1, wherein determining whether the MME system exists comprises determining whether an SGs state is an SGs-Null state.

5. The method of claim 1, wherein transmitting the paging message comprises updating an SGs state from an SGs-Null state to an SGs-Associated state indicating a connection to the MME system.

6. A paging message processing system comprising:
a communication unit configured to transmit a paging message and receive a response message in response to the paging message; and
a control unit configured to:
determine, if an inbound call occurs, whether a mobility management entity (MME) system exists,
transmit, if no MME system exists, a paging message over an IU interface,
determine whether an IU paging timer has expired, wherein the IU paging time is used to determine whether a response to the paging message has been received,
determine, if no response message is received, whether a location registration request is received from the MME system,
transmit, if the location registration request is received, a location registration response to the MME system to deliver the paging message via the MME system,
stop the page procedure over the IU interface,
transmit the paging message via the MME system connected through service gateways (SGs), and
process, if a paging response is received, the inbound call.

7. The paging message processing system of claim 6, wherein the control unit is configured to determine, if the IU paging timer has not expired, whether the location registration has been requested.

8. The paging message processing system of claim 6, wherein the control unit is configured to end, if the IU paging timer has expired, the paging procedure.

9. The paging message processing system of claim 6, wherein the control unit is configured to determine whether an SGs state is an SGs-Null state.

10. The paging message processing system of claim 6, wherein the control unit is configured to update an SGs state from an SGs-Null state to an SGs-Associated state indicating a connection to the MME system.

* * * * *